United States Patent [19]  [11] 4,086,768
Eickmann  [45] May 2, 1978

[54] DRIVING AND CONTROLLING UNIT

[76] Inventor: Karl Eickmann, 2420 Isshiki, Hayama-machi, Kanagawa-ken, Japan

[21] Appl. No.: 610,872

[22] Filed: Sep. 8, 1975

Related U.S. Application Data

[62] Division of Ser. No. 416,237, Nov. 15, 1973, abandoned, which is a division of Ser. No. 131,782, Apr. 6, 1971, Pat. No. 3,790,105.

[51] Int. Cl.² .............................................. F16D 31/02
[52] U.S. Cl. ........................................ 60/484; 60/486; 60/701; 244/53 R
[58] Field of Search ................. 60/484, 486, 430, 701, 60/424, 700; 244/53 R; 91/171

[56] References Cited

U.S. PATENT DOCUMENTS

| 1,827,438 | 10/1931 | Rauch | 244/53 R |
| 2,212,490 | 8/1940 | Adler, Jr. | 244/53 R |
| 2,454,138 | 11/1948 | Delzer | 417/318 |
| 2,486,049 | 10/1949 | Miller | 115/35 |
| 2,514,822 | 7/1950 | Wolfe, Jr. | 244/2 |
| 2,558,071 | 6/1951 | Castle, Jr. | 91/171 X |
| 3,253,806 | 5/1966 | Eickmann | 244/53 R X |
| 3,253,807 | 5/1966 | Eickmann | 244/53 R X |
| 3,345,016 | 10/1967 | Eickmann | 60/484 X |
| 3,790,105 | 2/1974 | Eickmann | 60/484 X |

*Primary Examiner*—Allen M. Ostrager

[57] ABSTRACT

A hydraulically driving and controlling - unit comprises a power plant which drives a fluid flow producing device for the separate production and supply of pairs of flows of hydraulic fluid under pressure. The unit supplies at least one pair of flows to at least two fluid motors. Rates of flow in flows are proportionate to each other whereby motors of same pair of flow are actuated and maintained to act with to each other proportionate speed of motion. Unit may be transportable and adaptable to machines or vehicles. The drive unit may include a plurality of power plants and fluid flow producing devices. In such multiple unit one way valves are set into fluid lines which may combine partially after those one way valves for directing each one flow from a different power plant to the same motor. Thereby the unit can continue to operate, when one of the plurality of power plants fails. The proportionateness of speed of motion of the motors which is enforced by the proportionateness of rates of flow in the separated flows can be utilized to equalize or synchronize the motion of machines or vehicles or of driving members thereof.

1 Claim, 7 Drawing Figures

DRIVING AND CONTROLLING UNIT

CROSS-REFERENCE TO RELATED APPLICATIONS

This patent application is a divisional application of my copending patent application Ser. No. 416,237, filed Nov. 15, 1973, now abandoned which is a divisional application of application Ser. No. 131,782 filed Apr. 6, 1971; which matured in the meanwhile to be now U.S. Pat. No. 3,790,105; issued on Feb. 5, 1974. Priority dates of said patent are claimed for this divisional application.

SUMMARY OF THE INVENTION

This invention relates to a driving and controlling unit which can be applied to fluid stream operated vehicles, such as vehicles supported or driven by rotating propellers, and, more particularly, to novel, simplified and improved hydraulic driving and control means for such vehicles.

In accordance with the invention, hydraulic fluid operated motors, driving propellers, are arranged in pairs, with the motors of each pair being arranged symmetrically on respective opposite sides of the longitudinal axis of the vehicle, and being of substantially equal rating. The motors are of a type known as positive displacement hydraulic fluid operated motors for revolving rotary members, such as propellers. Hydraulic fluid flow producing means, such as hydraulic fluid pumps driven by internal combustion engines or the like, are provided on the vehicle, and each fluid flow producing means has a pair of outputs whose fluid flows are substantially equal or proportionate to each other. One hydraulic fluid output of each fluid flow producing means is supplied to the positive displacement hydraulic motor or motors on one side of the vehicle's longitudinal axis, and the other hydraulic fluid output of each fluid flow producing means is supplied to the propeller driving motors on the opposite side of the longitudinal axis of the vehicle.

Where more than one positive displacement hydraulic motor is provided on each side of the vehicle, the motors on each side may be supplied with hydraulic fluid in either a parallel connection or a series connection. In addition, bypass means may be provided between each hydraulic fluid supply line and the associated return line in order to adjust the relative rates of operation of the motors on opposite sides of the vehicle axis, in order to effect a turning movement or the like. Alternatively, means may be provided to supply an additional fluid flow to the motor or motors on one side of the vehicle axis in order to accelerate the same relative to the motor or motors on the other side of the vehicle axis, or vice versa.

The control and driving means of the invention is applicable to airborne vehicles, to waterborne vehicles, or to land vehicles such as wheeled vehicles or vehicles operating on runners or the like. The outstanding feature of the invention hydraulic drive and control means is the stability of attitude of the vehicle to which the driving and control means are applied, as well as a great reduction in cost of the vehicles. The vehicles are simple, easy to control, and free of the usual disturbances attendant upon mechanical driving means.

An object of the invention is to provide inexpensive and simple hydraulic drive and control arrangements for fluid stream driven vehicles.

Another object of the invention is to provide such arrangements including positive displacement rotary fluid motors arranged in pairs and each driving a propeller or the like, with the motors of each pair being disposed at equal distances on opposite sides of the longitudinal axis of the vehicle, and with the motors of each pair being supplied, from a fluid flow producing means, with constantly proportional or equal fluid flows.

A further object of the invention is to provide such driving and control arrangements including means for controllably varying the rate of flow of working fluid to the motors on one side of the vehicle relative to those on the other sides of the vehicle to create a turning movement of the vehicle.

Another object of the invention is to provide such hydraulic driving and control arrangements including respective flow rate adjustment means for each of two or more outputs of a hydraulic fluid flow producing means, with the adjustment means being operable either individually or conjointly.

A further object of the invention is to provide such flow rate controlling means in the form of controllable bypasses between respective supply lines and the associated return lines.

Another object of the invention is to provide such a hydraulic driving and control arrangement in the form of a separate unit which may be secured to or mounted on a vehicle of any type.

A further object of the invention is to provide novel airborne, waterborne, or land vehicles incorporating the hydraulic driving and control arrangements of the invention.

Another object of the invention is to provide such a hydraulic control and driving arrangement in which the driven propellers, or other fluid flow creating means, operate in ducts or the like serving as lift creating means.

A further object of the invention is to provide such a hydraulic control and driving arrangement in which each positive displacement rotary fluid motor on one side of the vehicle axis is connected in series with the other motor of a pair on the opposite side of the vehicle axis.

For an understanding of the principles of the invention, reference is made to the following description of typical embodiments thereof as illustrated in the accompanying drawings.

DESCRIPTION OF THE PREFERRED EMBODIMENTS

Figure 1:
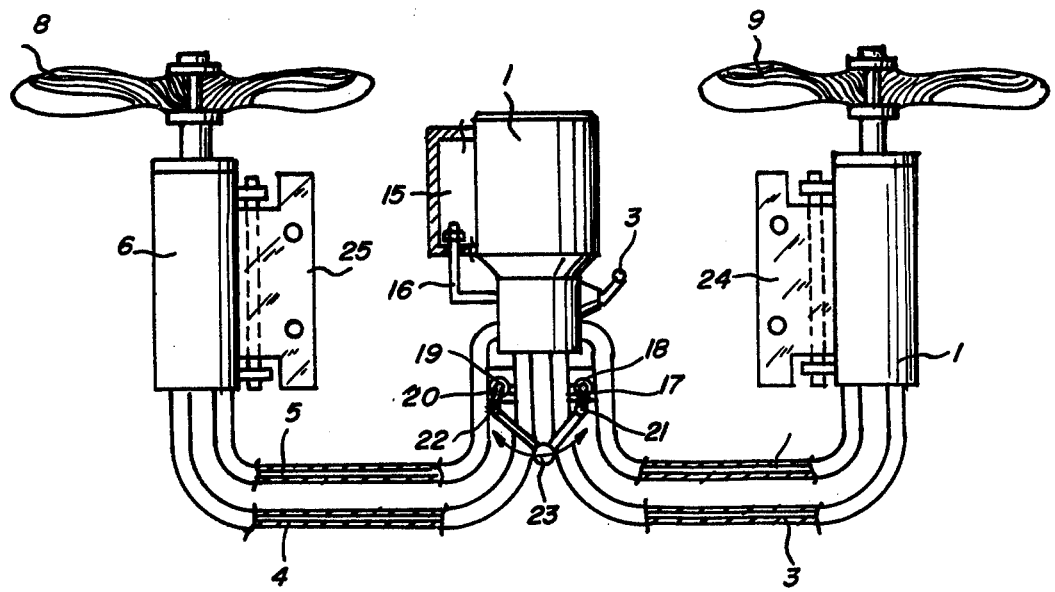
FIG. 1 is an elevation view, partially in section, of a hydraulic control and driving arrangement embodying the invention, and which can be mounted on any suitable type of vehicle.

The hydraulic driving and control arrangement illustrated in FIG. 1 is a unit which can be mounted on any type of vehicle. This unit may also be used to drive or control any suitable machine or device. This unit includes a power plant driving fluid flow producing means 1 having outputs with proportional or equal delivery rates, connected to respective supply lines 4 and 5 which deliver working hydraulic fluid to respective positive displacement fluid motors 6 and 7 at proportionate or equal flow rates. Respective return lines 14 and 13 connect motors 6 and 7 to fluid flow producing means 1, which may withdraw fluid from tank or reservoir 15 through line 16 and which is preferably provided with a fluid flow adjusting means 3 effective to control the displacement value of the displacement chambers therein in proportion to each other. Control adjustment means 3 thus assures that, at all times, hydraulic working fluid is supplied to the motors 6 and 7, driving propellers 8 and 9, at equal or proportionate rates of flow and in supply lines which are separate from each other.

Respective bypass lines 17 and 19, each including a respective control means 18 and 20, interconnect respective supply lines 4 and 5 to respective return lines 13 and 14. Bypass lines 17 and 19 have a very small cross-sectional area, compared to those of supply lines 4 and 5, and thus allow bypassing only a small proportion or fraction of the working fluid. Control means 18 and 20 may be operated separately or may be conjointly operated through connection means 21 and 22 connected to a combined operating means 23. By using means or handle 23, it is possible to change the relative angular velocities of propellers 8 and 9 by operating only a single control handle.

The unit shown in FIG. 1 is transportable and may be mounted on any kind of vehicle by the adapting means 24 and 25, with the mounting on the vehicle being effected in a manner such that motors 6 and 7 are located symmetrically on opposite sides of the vehicle longitudinal axis. By virtue of a pivoting arrangement provided between each adapting member and the associated motor, the motors 6 and 7 can be swung into or out of the vehicle.

Figure 2:
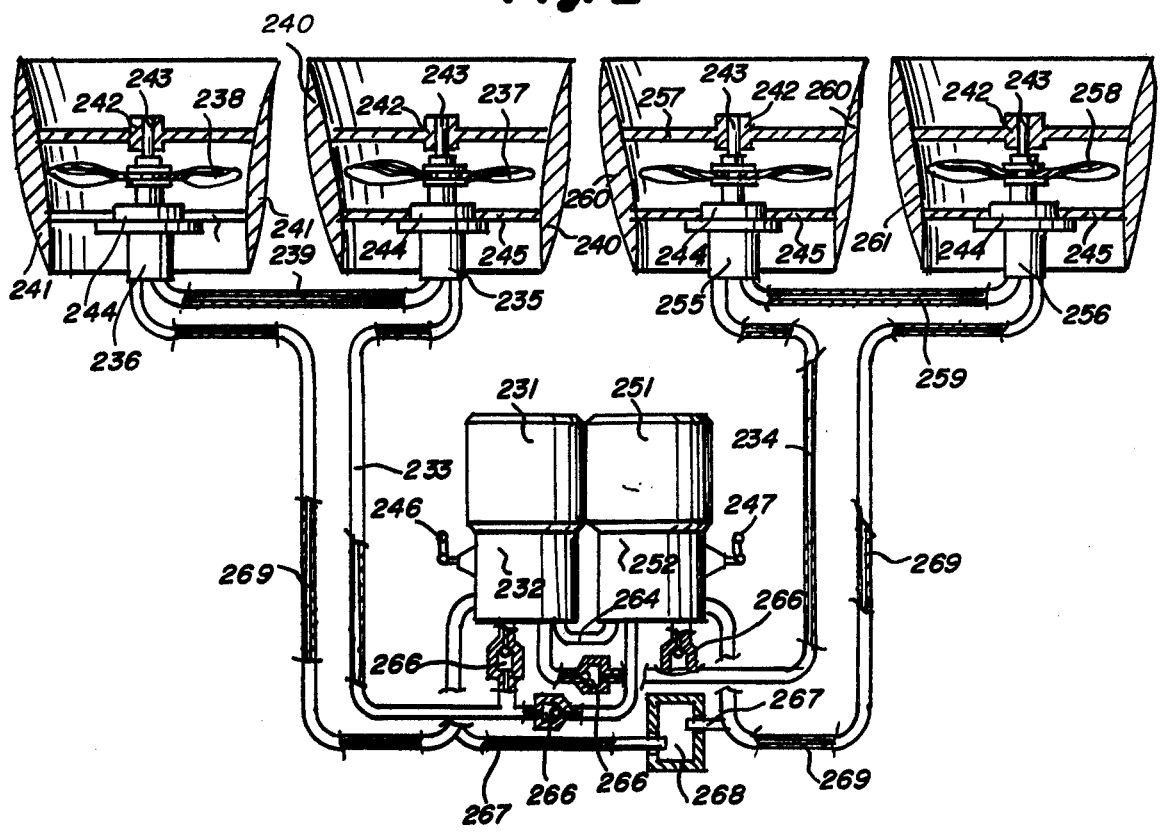
FIG. 2 is a view, similar to FIG. 1 of another embodiment of the hydraulic control and driving means of the invention, and which also can be mounted on any suitable type of vehicle.

In the self-contained unit shown in FIG. 2, two fluid flow producing means 232 and 252, driven by respective power plants 231 and 251, supply two pairs of positive displacement rotary fluid motors 235, 236 and 255, 256, each driving a respective propeller 237, 238 and 257, 258. Each fluid flow producing means has two separate outputs having proportionate or equal rates of flow of working fluid. The inlets of fluid flow producing means 232 and 252 may be connected either separately or conjointly to a tank or reservoir 268.

A supply line 233 extends from one output of fluid flow producing means 232 to an inlet of fluid motor 235, and the outlet of fluid motor 235 is connected to the inlet of fluid motor 236 by a line 239. The outlet of motor 236 is connected by a return line 269 either to a fluid flow producing means or to tank 268. Thus, motors 235 and 236 receive the same flow of working fluid and are connected in series with each other. The other outlet of fluid flow producing means 232 is connected by a supply line 234 to the inlet of rotary fluid motor 255, and a line 259 connects the outlet of rotary fluid motor 255 to the inlet of rotary fluid motor 256. A return line 269 connects the outlet of motor 256 to either a fluid flow producing means or to tank 268. Thus, motors 255 and 256 are connected in series with each other and receive the same flow of fluid therethrough.

Each pair of series connected motors thus receives a separate fluid flow, and the two fluid flows have proportionate or equal flow rates. Due to the equal or proportionate angular velocities of the four fluid motors, the respective propellers are driven at equal or proportionate angular velocity to provide fluid streams of substantially equal thrusts. second output It will be noted that one output of fluid flow producing means 232 is connected to supply line 233 by a checkvalve means 266, and correspondingly one output of fluid flow means 252 is connected to supply line 233 through a checkvalve means 266 whereby first outputs of both fluid flow producing means are combined into a single first flow of working fluid in supply line 233. The second output of fluid flow producing means 232 is connected through a checkvalve means 266 to supply line 234, to which the secondoutput of fluid flow producing means 252 is also connected through a checkvalve means 266, the two second outputs thus being combined into a single flow through supply line 234.

Thus, if either one of the fluid flow producing means 232, 252, or either one of the respective power plants 231, 251, fails, the other fluid flow producing means would still deliver two outputs, one to supply line 233 and the other to supply line 234. The checkvalve means prevent backflow of fluid in the event of failure of one or the other of either the fluid flow producing means or the associated power means.

Return lines 269 return the working fluid directly or indirectly into tank 268, although a cooling means may be interposed in advance of this tank. The return lines may be connected to the common intermediate line 264, which could also be a drain line. Lines 267 represent suction lines leading from tank 68 to the fluid flow producing means 232 and 252.

Additionally, each fluid flow producing means preferably is provided with a respective fluid flow adjusting means 246, 247 operable to change the effective displacement of the pumping chambers in the fluid flow producing means, between a minimum and a maximum value, and vice versa, and, during operation of the fluid flow producing means, to adjust proportionately the two outputs of each fluid flow producing means. These adjusting means may be individually operated or they may be operated by a combined operating member.

A feature of the embodiment of the invention shown in FIG. 2 is that the propellers are mounted in respective ducts 240, 241 and 260, 261 having axial cross-sections such that the ducts can act somewhat in the nature of lift devices, which greatly increases the thrusts due to the rotating propellers. The several motors are mounted in the ducts by virtue of respective flange means 244 secured to respective support members 245, and the output shaft of each motor, connected to the associated propeller, is supported in a respective bearing means 243 of a support 242 extending transversely of the associated ducts. This enclosing of the propellers and their driving motors in the ducts has an advantage from the safety standpoint in that the propellers are protected from contact with persons or animals. In the same manner as in the embodiment of FIG. 1, the unit of FIG. 2 may be mounted on any type vehicle.

Figure 3:
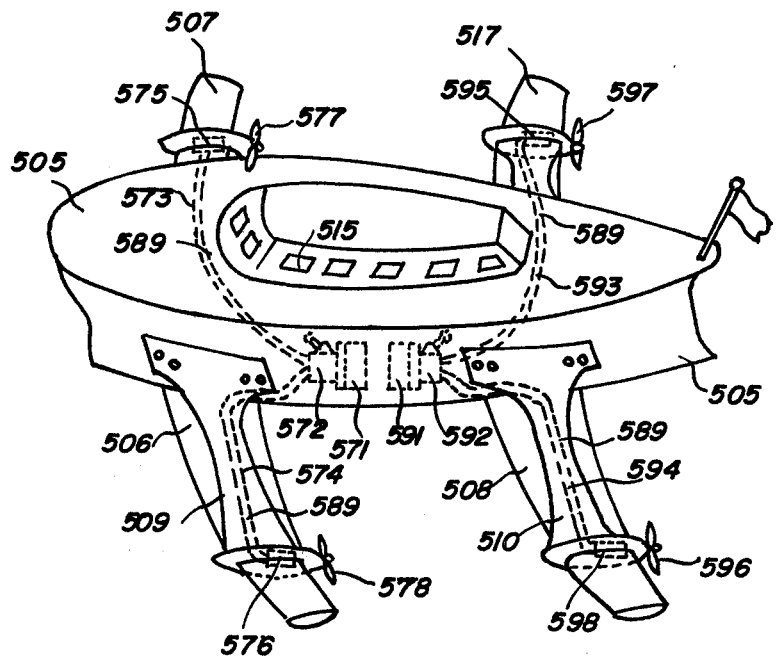
FIG. 3 is a perspective view of a waterborne hydrofoil vehicle embodying the hydraulic control and driving means of the invention.

The waterborne vehicle illustrated in FIG. 3 includes hydrofoils or wings 506, 507, 508 and 517 arranged in pairs with the wings of each pair on opposite sides of body 505 which may include a passenger or freight compartment 515. Body 505 carries drive means 571 and 591 driving respective fluid flow producing means 572 and 592, each drive means and its associated fluid flow producing means preferably being mounted as low as possible on body 509 to insist in maintaining stability of the vehicle. Each fluid flow producing means provides two separated outputs of equal or proportionate working fluid flow velocity, with the two flows being completely separate from each other. The hydrofoils are braced from body 505 by suitable supporting struts 509 and 510.

The respective outputs of fluid flow producing means 572 are connected, through respective supply lines 573 and 574 to respective positive displacement rotary fluid motors 575 and 576 driving respective propellers 577 and 578, the fluid flow being returned through respective return lines 589. Similarly, the respective outputs of means 592 are connected by respective supply lines 593 and 594 to respective positive displacement rotary fluid motors 595 and 596 driving respective propellers 597 and 598, with the working fluid being returned through respective return lines 589. The motors are mounted on respective hydrofoils, and are arranged symmetrically with respect to the longitudinal center line of body 505. Additionally, the motors preferably are equal in size, as are also the respective propellers, so that the thrusts provided by the four motors are substantially equal to each other.

If both power plants and their fluid flow producing means are operating, equal flows of working fluid are delivered to all the motors for driving all the propellers at substantially equal angular velocities. The resultant thrusts are sufficiently strong, upon an increase in the angular velocities of the propellers, that body 505 is lifted out of the water and is supported substantially entirely by the wings or hydrofoils. The symmetrical motor arrangement provides for driving the vehicle stably in a forward direction, with the thrust forces being in equilibrium with the resistant forces acting on the hydrofoils. This assures stability of movement of the vehicle and easy control thereof and, at the same time, the vehicle is simple and relatively inexpensive to construct and the relatively small roatary fluid motors offer little resistance to vehicle movement.

While only one fluid flow producing means and its associated drive could be provided to operate either pair of rotary fluid motors, each mounted on a respective hydrofoil, the vehicle preferably is provided with two sets of motors each mounted on a respective hydrofoil. The fluid flow producing means can be either variable or constant flow means and, in the event that they are variable flow means, fluid flow adjusting means are provided for each producing means. Alternatively, the outputs can be varied by controlling the speed of the driving means 571 and 591.

Figure 4:
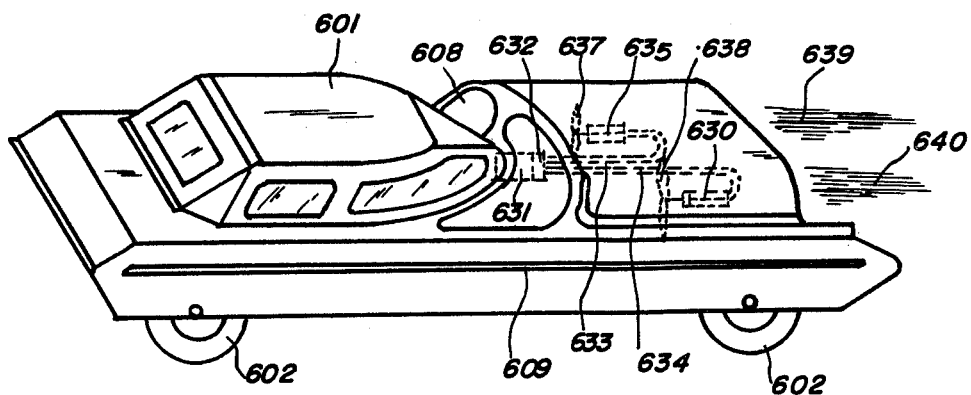
FIG. 4 is a perspective view of a wheeled land vehicle embodying the hydraulic control and driving means of the invention.

The land vehicle illustrated in FIG. 4 has a body 601 supported on wheels or rollers 602, and the body sudpports a power plant 631 driving a fluid flow producing means 632 having two or more entirely separated outputs providing working fluid flows of equal or proportionate velocity. The respective two outputs of fluid flow producing means 632 are connected, by respective supply lines 633 and 634 to respective positive displacement fluid flow motors 635 and 636, with the working fluid being returned through respective return lines. Motors 635 and 636 drive respective propellers 637 and 638, so that, with equal or proportional flows of working fluids to both motors, these propellers produce equal or proportionate air flows, and preferably air flows which are equal in flow rate. The propellers and associated motors are symmetrically arranged on opposite sides of the longitudinal center line of the vehicle, so that the vehicle is driven stably, either forwardly or backwardly, by the reaction forces from fluid streams 639 and 640. For protective purposes, propellers 637 and 638 are disposed in respective ducts 608 and 609.

The speed of the vehicle can be controlled by varying, in a proportionate or equal manner, the rate of delivery of working fluid to the two motors, and such variation can be effected either by a suitable flow adjustment device or by varying the speed of power plant 631. In the manner described for other embodiments, bypass means or additional fluid flow control means can be provided to effect a differential between the thrusts 639 and 640 to effect a selected turning movement of the vehicle.

Figure 5:
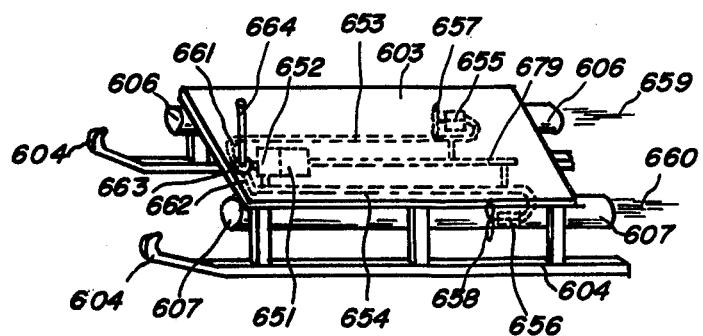
FIG. 5 is a perspective view of a sled embodying the hydraulic control and driving means of the invention.

FIG. 5 illustrates a fluid stream driven sled including a body 603 supported on runners 604 and having connected thereto ducts or tubes 606 and 607. Duct 605 contains one or more positive displacement rotary fluid motors 655, and duct 607 contains one or more positive displacement rotary fluid motors 656. Revolving members or propellers 657, 658, driven by respective fluid motors 655, 656, create fluid streams inside the respective ducts 606, 607, and these fluid streams are shown at 659 and 660. The working fluid for the motors is provided by a fluid flow producing means 652 driven by a power plant 651, and having two outputs providing proportionate or equal rates of flow of the working fluids. The outputs of means 652 are connected through respective delivery lines 653 and 654 to the respective motors 655 and 656, to drive these motors and the associated propellers, and the fluid is returned by return lines 679 directly or indirectly into the fluid flow producing means, so that the vehicle is driven by the reaction forces of air streams 659 and 660. The straightness and stability of movements of sled 603 is assured due to the equilibrium of the thrust forces and the resisting forces.

The ducts containing the rotary fluid motors are mounted symmetrically on opposite sides of the longitudinal center line of the vehicle and, as the relatively wide lateral spacing of the two fluid streams increases the stability of movement of the sled, very simple steering means can be provided in the form of a bypass control means 664 included in a bypass line 661. By operation of control means 664, it is possible to create a differential between the thrusts 659 and 650, resulting in steering of the sled in a selected direction.

Alternatively, instead of providing this bypass means, it is also possible to provide an additional fluid flow producing means for supplying additional working fluid to a selected one of the two supply lines in accordance with the desired direction of turning movement of the sled. This additional fluid flow could be directed by a control means 663 into either supply line 661 or 662. Such a control by supplying an additional fluid is also applicable to the other embodiments of this invention.

Figure 6:
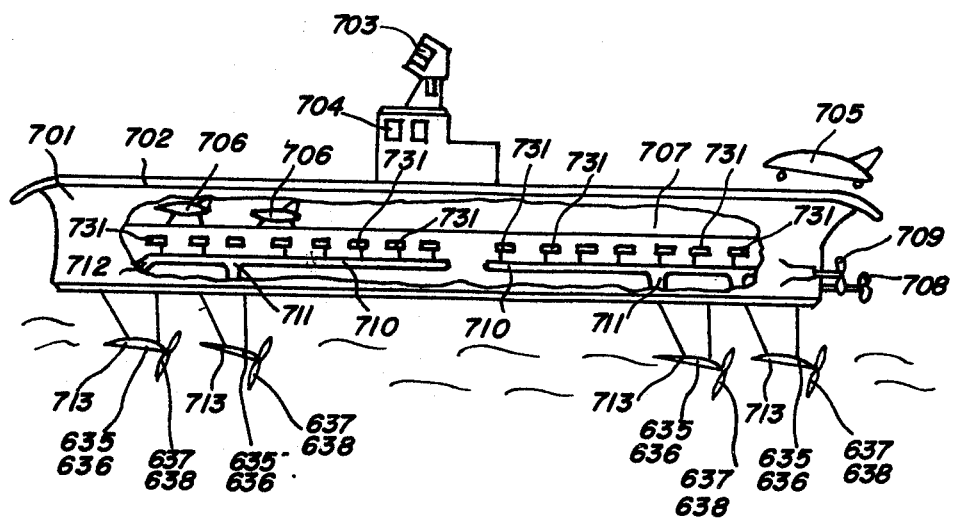
FIG. 6 is a side elevation view, partially broken away, of a large waterborne vessel embodying the hydraulic control and driving means of the invention.

The very large waterborne vessel shown in FIG. 6 is a hydrofoil vessel including a body 701 which may be utilized for passengers or cargo, or which may be the body of an aircraft carrier, and a control tower 704 is mounted on the upper deck and has airspace control means 703 mounted thereon. The upper deck may be designed, for example, for the landing or take-off of aircraft, and aircraft or other cargo may be stored in the spaces 706 and 707 below the upper deck.

The vehicle is provided with a plurality of hydrofoils or wings 713 each having mounted thereon a pair of positive displacement rotary fluid motors 635 and 636 driving respective propellers 637 and 638, the motors of each pair being disposed symmetrically on opposite sides of the longitudinal center line of the vehicle. In order to drive the propellers at sufficiently high angular velocities to move the vessel through the water at a rate sufficiently high that it will rise on hydrofoils 713, a plurality of power plants and associated fluid flow producing means driven thereby are provided, as indicated at 731, and each fluid flow producing means has a pair of separate outputs providing proportionate or equal rates of flow of working fluid. The fluid flow producing means are arranged in two groups, each including a pair of common supply lines 710 each connected to a respective different output of the fluid flow producing means of the respective group. There are thus four common supply lines 710, two connected to the rearward motors 635, 636, and two connected to the forward motor 635 and 636. The forward common supply lines 710 branch into supply lines 711 and 712, as do also the rearward common supply lines 710. Consequently, substantially equal thrusts are provided by all of the propellers 637, 638, which assures stability of movement and attitude of the vehicle by assuring equilibrium between the thrust forces and the movement resisting forces. During such times as the vessel may not be operated at high speed, or at a speed sufficiently high to rise on the hydrofoils, one or more of the fluid flows can be directed into fluid flow motors driving conventional propellers 708 and 709.

Figure 7:
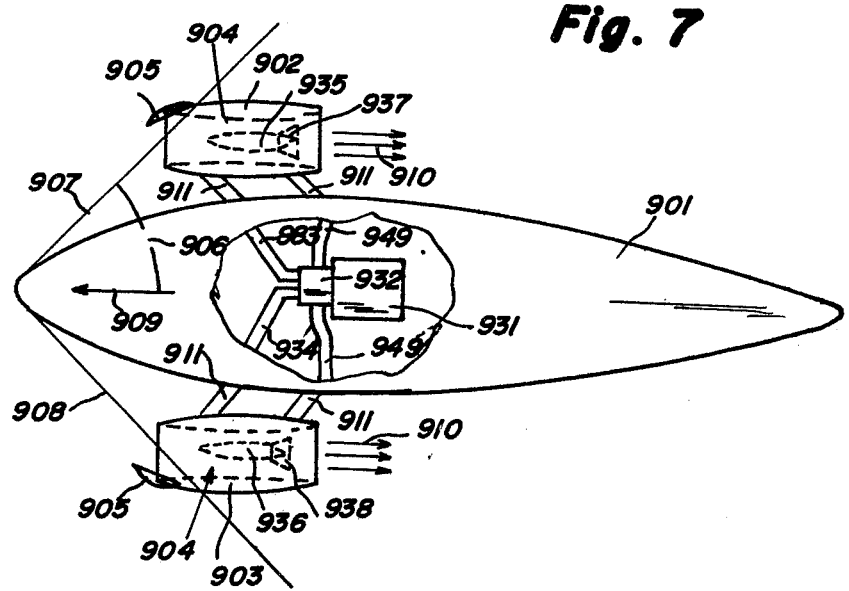
FIG. 7 is a top plan view of a waterborne vehicle embodying the hydraulic control and driving means of the invention.

FIG. 7 illustrates a waterborne vehicle.

During movement of this vehicle, a pair of headwaves 907, 908, at an inclination 906 relative to the direction of movement 909 of body 901, is created, and these headwaves are under a higher static pressure and raise the surface of the water in their areas. In accordance with the invention, a pair of fluid flow creating means 937 and 938, providing two or more fluid streams 910, are positioned symmetrically on opposite sides of the bow of body 901, so that headwaves 907 and 908 can enter into the suction or intake areas 905 of these fluid flow creating means. The intake areas 905 may comprise guide vanes or the like, in order to change the direction of movement of the headwaves contrary to the motion 909 of body 901. This results in an increase in the thrust for driving the vehicle forwardly and this in an increase in the velocity of the vehicle. The power supply unit for the fluid flow creating means 937 and 938 may be of a conventional type or may be the hydraulic control and driving means of the present invention.

By way of example, a power plant 931 may drive the fluid flow producing means 952 having plural separate fluid outputs 933 and 934 providing proportionate or equal rates of flow of working hydraulic fluid. One output is delivered to fluid motor 935 and the other to fluid motor 936, each operating a respective propulsion member 937, 938 so that the fluid streams 910 have proportionate or equal rates of flow. The return fluid flow occurs directly or indirectly through fluid flow lines 949.

While specific embodiments of the invention have been shown and described in detail to illustrate the application of the principles of the invention, it will be understood that the invention may be embodied otherwise without departing from such principles.

What is claimed is:

1. A drive and control unit comprising in combination:

at least a pair of power plants;

at least a pair of fluid flow producing devices;

at least a pair of hydraulic motors;

said devices associated to and driven by said power plants;

said devices including each a plurality of separated working chamber groups of each a plurality of commonly acting fluid displacement chambers and thereto associate displacement means in each of said groups;

said devices producing in said groups at least two pairs of separated output flows of hydraulic fluid under pressure with the rates of flow in said flows being constantly proportionate to each other;

at least four one-way check-valves for permitting flow therethrough in one direction and for the prevention of flow therethrough in the other direction;

separate supply lines each one extending from one of said groups of said devices to each one of said one-way valves, whereby at least each one pair of one-way valves is communicated to each one of said devices;

each one delivery fluid line associated to each of said motors; at least one communication from each one valve of each of said pairs of one-way valves to one of said delivery fluid lines;

and at least another communication from each other valve of the said pair of one-way valves to another of said delivery fluid lines;

whereby flows of fluid from at least a pair of fluid flow producing devices are assured to each of said motors and whereby flow of fluid to each of said motors remains assured even when one of the power plants fails while return-flow to a failing fluid flow producing device is prevented by said one-way valves between said supply lines and said communications.

* * * * *